Figure 1:
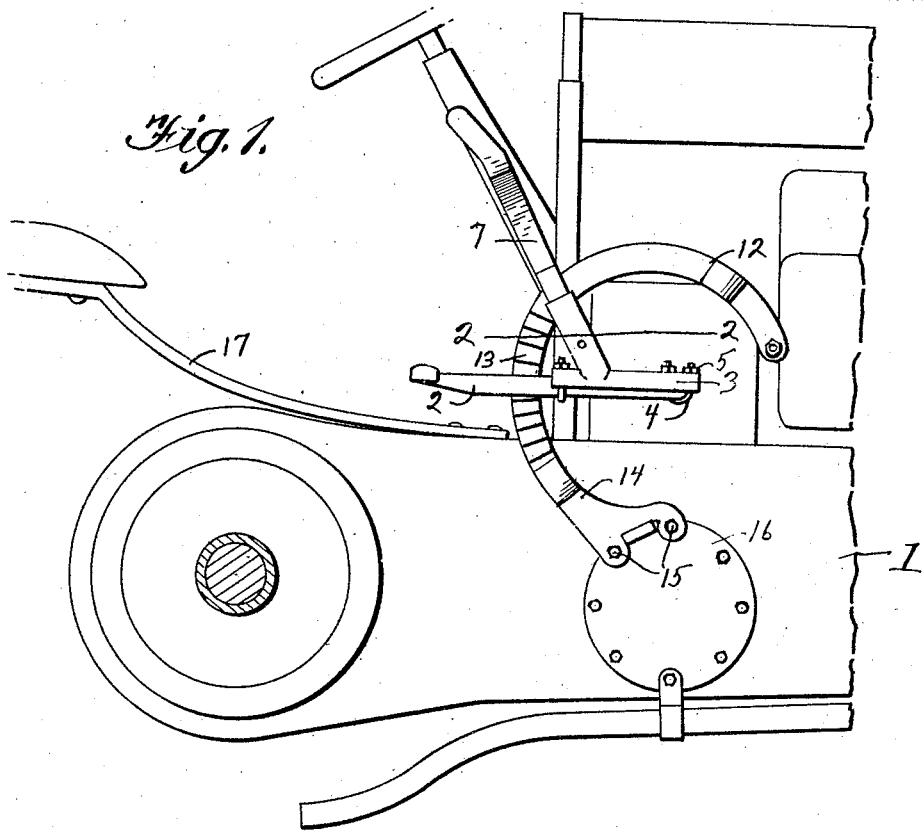

L. E. BLANCHARD.
LEVER CLUTCH RELEASE.
APPLICATION FILED JAN. 10, 1921.

1,404,174.

Patented Jan. 17, 1922.
2 SHEETS—SHEET 1.

WITNESSES.

Inventor
LEROY E. BLANCHARD.

By Richard B. Owens.
Attorney

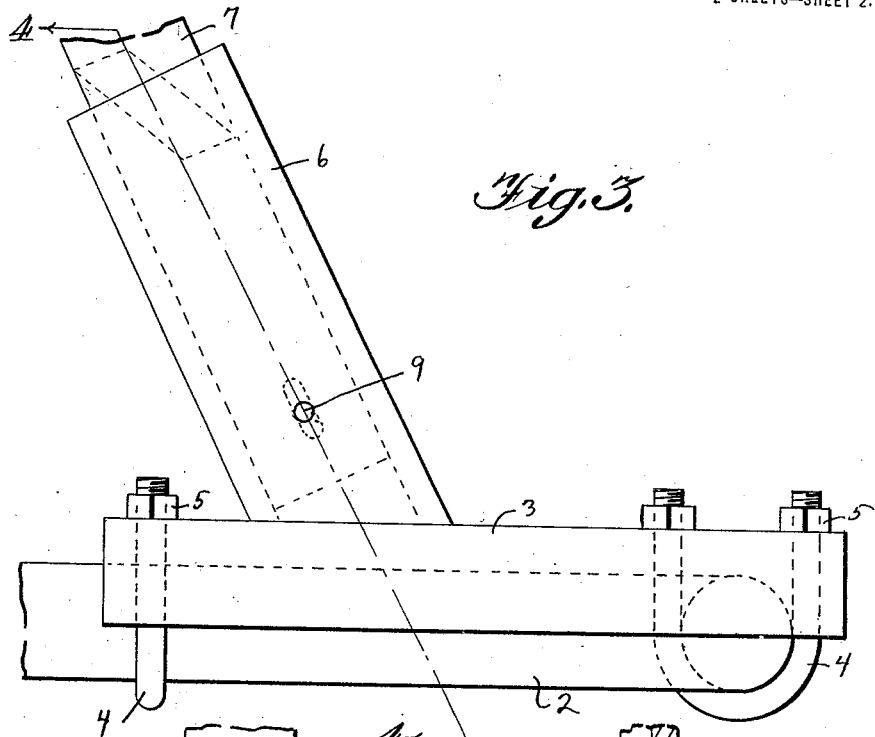

UNITED STATES PATENT OFFICE.

LEROY E. BLANCHARD, OF ST. LAWRENCE, SOUTH DAKOTA.

LEVER CLUTCH RELEASE.

1,404,174.　　　　Specification of Letters Patent.　　Patented Jan. 17, 1922.

Application filed January 10, 1921.  Serial No. 436,211.

*To all whom it may concern:*

Be it known that I, LEROY E. BLANCHARD, a citizen of the United States, residing at St. Lawrence, in the county of Hand and State of South Dakota, have invented certain new and useful Improvements in a Lever Clutch Release, of which the following is a specification.

This invention relates to a lever attachment for the clutch of a Fordson tractor and has for its object to permit the operation of the clutch of the tractor by hand; to eliminate the danger of the tractor leaving the ground in front which is caused by the operator's foot slipping off the clutch pedal and letting the clutch engage too suddenly; to permit the cranking of the tractor engine with the belt on the pulley attachment without the necessity of another hand to hold the pedal downwardly; and, to make it possible to stop the tractor in order to perform small repairs on the implement the tractor may be pulling without changing the gears of the tractor into neutral.

With the above and numerous other objects in view this invention comprises such novel features of construction, the arrangement and combination of parts, as will be hereinafter more fully described and claimed.

In the drawing:—

Figure 2:
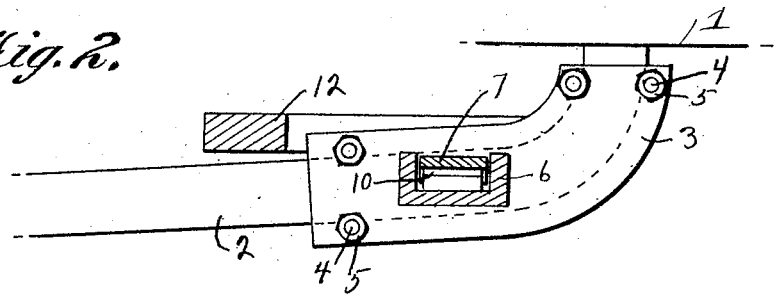

Figure 1 is a fragmentary side elevation of a Fordson tractor showing my invention attached thereto, Figure 2 is an enlarged section taken on the line 2—2 of Figure 1 looking downwardly, Figure 3 is an enlarged side elevation of the device showing portions thereof broken away, Figure 4 is a section taken on the line 4—4 of Figure 3 looking in the direction of the arrow, and Figure 5 is an enlarged fragmentary elevational view of the lever showing the ratchet tooth thereon.

Referring to the drawings in detail it will be seen that 1 designates the Fordson tractor having the usual clutch pedal 2 provided thereon. On this clutch pedal 2 I provide a channeled casting 3 which is curved at its ends so as to conform to the shape of the pedal 2 and is held thereon by means of U-bolts 4 and suitable nuts 5. This channeled casting 3 will be situated upon the upper portion of the pedal 2 and will have extending therefrom the bracket 6 which is constructed so as to be substantially U-shape in cross section. A lever 7 will have its lower portion positioned in the channel provided in the bracket 6. This lever 7 is provided with an elongated slot 8 adjacent its lower end for receiving the pin 9 which is fixed to the bracket 6. A leaf spring 10 is situated between the lever 7 through the base portion of the bracket 6 and is constructed so as to normally hold the lever 7 at a distance from the base of the bracket 6, and so that the ratchet tooth 11 provided on the lever 7 will engage the ratchet bar 12. This ratchet bar 12 is suitably mounted upon the tractor and will have a circular formation having the ratchet teeth 13 provided thereon intermediate its ends. The lower portion of the ratchet bar 12 will be offset as shown at 14 so that the pair of apertured lips 15 may be engaged by the bolts which are found on the top 16.

Considering the operation of the device as though one was sitting in the tractor seat 17 it will be readily seen that as the foot pedal 2 or the lever 7 is pulled downwardly the ratchet tooth 11 will engage the ratchet teeth 13 on the ratchet bar 12 and hold the pedal 2 in any desired position. When it is desired to release the pedal 2 all that it will be necessary will be to push or kick the lever 7 to the right of the tractor.

It is thought that the foregoing description taken in connection with the accompanying drawings, the construction and operation of the invention will be readily understood without a more extended explanation. As numerous changes in form, proportion, and in the minor details of construction may be resorted to without departing from the spirit of this invention, I do not wish to be limited to the construction herein shown and described.

Having thus described my invention what I claim as new is:—

1. In combination, a lever, a bracket formed of channel iron for receiving the lever, means for attaching the bracket to a foot pedal, a ratchet bar, and means in the bracket for forcing the lever into engagement with the ratchet bar.

2. In combination, a lever, a bracket being substantially U-shaped in cross section for receiving the lever, means for attaching the bracket to a foot pedal, a ratchet bar, and a spring in the bracket for forcing the lever into engagement with the ratchet bar.

3. In combination, a lever, a bracket being substantially U-shape in cross section for receiving the lever, a channeled casting fixed to the bracket and adapted to be attached to a foot pedal, a ratchet bar, and means in the bracket for forcing the lever into engagement with the ratchet member.

4. In combination, a lever, a ratchet tooth provided on the lever intermediate its ends, a bracket being substantially U-shape in cross section for receiving the lever, a channeled casting fixed to the bracket and adapted to be attached to a foot pedal, a ratchet bar, a spring in the bracket disposed between the base thereof and the lever for forcing the ratchet tooth of the lever into engagement with the ratchet bar.

In testimony whereof I affix my signature in presence of two witnesses.

LEROY E. BLANCHARD.

Witnesses:
LOUIS STECHMANN,
OPAL MAGNESS.